(12) United States Patent
Vellore Babu et al.

(10) Patent No.: US 11,339,764 B2
(45) Date of Patent: May 24, 2022

(54) WIND TURBINE NACELLE COVER

(71) Applicant: Vestas Wind Systems A/S, Aarhus (DK)

(72) Inventors: Gopi Vellore Babu, Chennai (IN); Matthieu Alexandre, Århus (DK)

(73) Assignee: Vestas Wind Systems A/S, Aarhus (DK)

( * ) Notice: Subject to any disclaimer, the term of this patent is extended or adjusted under 35 U.S.C. 154(b) by 602 days.

(21) Appl. No.: 16/332,644

(22) PCT Filed: Sep. 6, 2017

(86) PCT No.: PCT/DK2017/050283
§ 371 (c)(1),
(2) Date: Mar. 12, 2019

(87) PCT Pub. No.: WO2018/050186
PCT Pub. Date: Mar. 22, 2018

(65) Prior Publication Data
US 2020/0332778 A1    Oct. 22, 2020

(30) Foreign Application Priority Data

Sep. 13, 2016   (DK) ............................ PA 2016 70698

(51) Int. Cl.
*F03D 80/80*     (2016.01)
*F03D 9/25*      (2016.01)
*F03D 80/00*     (2016.01)

(52) U.S. Cl.
CPC .............. *F03D 80/88* (2016.05); *F03D 9/25* (2016.05); *F03D 80/00* (2016.05);
(Continued)

(58) Field of Classification Search
CPC . F03D 80/88; F03D 9/25; F03D 80/00; F05B 2240/14; F05B 2260/602; Y02E 10/72
See application file for complete search history.

(56) References Cited

U.S. PATENT DOCUMENTS 10,006,442 B2\*  6/2018  Deicke .................. H02K 7/116
10,788,019 B2\*  9/2020  Petersen ................ F03D 80/80
(Continued)

FOREIGN PATENT DOCUMENTS

DE    102005032627 B3    8/2006
DE    102008027365 A1    12/2009
(Continued)

OTHER PUBLICATIONS

Danish Patent and Trademark Office, Search and Examination Report in PA 2016 70698, dated Feb. 28, 2017.
(Continued)

*Primary Examiner* — Pedro J Cuevas
(74) *Attorney, Agent, or Firm* — Wood Herron & Evans LLP (57) ABSTRACT

A nacelle bottom cover part (32) for the underside of a wind turbine nacelle is formed with a number of shallow receptacle regions for containing liquid leaked or spilled from turbine components. Overflow channels (88,90,92) may be provided between the receptacle regions so that leaked liquid can flow between receptacle regions.

22 Claims, 9 Drawing Sheets

(52) U.S. Cl.
CPC ..... *F05B 2240/14* (2013.01); *F05B 2260/602* (2013.01); *Y02E 10/72* (2013.01)

(56) References Cited

U.S. PATENT DOCUMENTS

| | | | |
|---|---|---|---|
| 10,975,850 B2* | 4/2021 | Rogg | F03D 80/70 |
| 2009/0107769 A1* | 4/2009 | Sato | B60K 6/365 |
| | | | 184/6.2 |
| 2011/0286844 A1* | 11/2011 | Takayanagi | F16H 57/0417 |
| | | | 416/95 |
| 2012/0211307 A1* | 8/2012 | Nielsen | F03D 80/70 |
| | | | 184/4 |
| 2013/0001017 A1* | 1/2013 | Saenz de Ugarte Sevilla | |
| | | | F03D 80/70 |
| | | | 184/6.12 |
| 2020/0072184 A1* | 3/2020 | Taubenrauch | F03D 1/00 |
| 2020/0124033 A1* | 4/2020 | Rogg | F03D 15/00 |
| 2021/0079898 A1* | 3/2021 | Vcelka | F03D 80/60 |

FOREIGN PATENT DOCUMENTS

| | | | | |
|---|---|---|---|---|
| EP | 2182208 A2 | 5/2010 | | |
| EP | 2829726 A1 | 1/2015 | | |
| EP | 2942522 A1 | 11/2015 | | |
| EP | 2947315 A1 | 11/2015 | | |
| EP | 3002456 A1 | 4/2016 | | |
| EP | 3372825 A1 * | 9/2018 | ............... | F03D 1/00 |
| WO | 2009149699 A2 | 12/2009 | | |
| WO | WO-2017032380 A1 * | 3/2017 | ............. | B65D 90/24 |
| WO | WO-2018162592 A1 * | 9/2018 | ............... | F03D 1/00 |
| WO | WO-2021098931 A * | 5/2021 | ............. | F03D 13/10 |

OTHER PUBLICATIONS

European Patent Office, International Search Report and Written Opinion in PCT/DK2017/050283, dated Nov. 29, 2017.
European Patent Office, Examination Report in EP17765074, dated Feb. 17, 2022.

* cited by examiner

WIND TURBINE NACELLE COVER

The present invention relates to a wind turbine nacelle which is adapted to contain spilled or leaked liquid from wind turbine components within the nacelle, more particularly a nacelle bottom cover so adapted.

Figure 1:
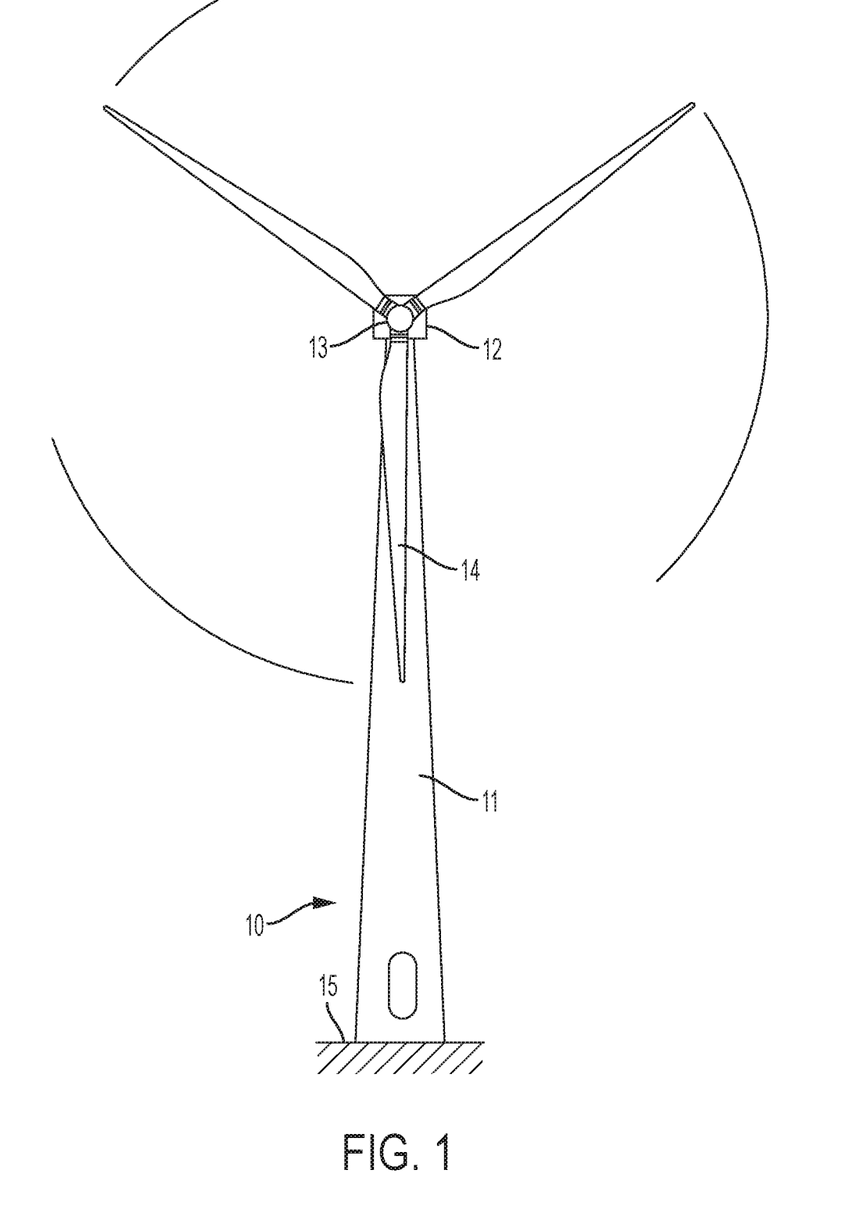
FIG. 1 is a front view of a wind turbine.

Wind turbines typically comprise a wind turbine tower and a wind turbine nacelle positioned on top of the tower. The wind turbine rotor, normally comprising three wind turbine blades, is connected to the nacelle through a main shaft which extends out of the front of the nacelle, as illustrated in FIG. 1.

The nacelle is provided with the mechanical and electrical equipment needed to transform, convert and in other ways handle the power being produced by the generator in the nacelle such as the gearbox, generator and transformer. Such components typically contain liquids for purposes of lubrication and/or cooling. For example, the gearbox being a major operative component with a large number of moving parts which require lubrication, may during normal operation leak small amounts of oil, and it is typically provided with a drip tray to catch this leakage. Although more significant leakage from such components is rare, it is nonetheless desirable to be able to contain such leakage should it arise. The use of individual drip trays adds to the constructional complexity of the nacelle and takes up additional space, and may not be sufficient in the event of more significant liquid leakage. Significant liquid leakage has the potential to damage other turbine components, create a hazard for personnel working in the turbine, and create an environmental hazard if such liquid should leak outside the turbine. There are furthermore situations in which liquids need to be exchanged by service personnel, and such service can constitute a time at which accidental spillage can arise.

Accordingly, there is need for an improved structure which can contain liquid leaked or spilled within the turbine.

SUMMARY OF THE INVENTION

According to a first aspect of the invention there is provided a cover part for the underside of a wind turbine nacelle which is formed with a number of shallow receptacle regions associated with respective turbine components for containing liquid leaked or spilled from the turbine components, wherein flow channels are provided between the receptacle regions so that liquid can flow between them.

The cover part may comprise a number of interconnected panels with the receptacles defined in some or all of the panels. The panels may be connected at overlapping edges. The receptacles are preferably defined at least in part by upstanding rims at edges of the panels. Individual panels may be further subdivided into additional receptacles by the provision of additional walls or rims, and wherein the flow channels are constituted by regions of reduced height provided in the rims so that liquid can overflow from one receptacle region to an adjacent receptacle region. In an alternative arrangement openings are provided in the upstanding rims to constitute the flow channels.

As used herein, the term "depth" refers to the maximum dimension of the bottom cover part in a direction perpendicular to the plane of the support.

As used herein, the term "beneath" refers to the vertical position of the bottom cover part when installed on the nacelle in the normal position on the wind turbine tower.

The receptacle regions are preferably arranged in the cover part so that in use they underlie the major components, a first receptacle region underlying a gearbox, a second a generator, a third a hydraulic accumulator. A fourth receptacle may be provided which is not associated with any particular component but which acts as a fluid-collecting buffer. Each receptacle region is dimensioned to receive between about 100 and 400 litres of liquid. Preferably, the first receptacle is dimensioned to receive at least 300 litres of liquid, more preferably about 330 litres. The second receptacle is dimensioned to receive at least 300 litres of liquid, more preferably about 360 litres. The third receptacle is dimensioned to receive at least 200 litres of liquid. The combined volume of all receptacles is preferably over 1000 litres, more preferably over 1100 litres.

In the preferred embodiment the cover part is formed of a moulded panel or panels in which the upstanding rims are moulded for ease of manufacture. The cover part is preferably formed of a plastics material or a composite material such as glassfibre-reinforced plastics.

In a further development the receptacle regions may be provided with drain holes fitted with plugs or valves to allow liquid to be drained therefrom.

In a further aspect the invention resides in a nacelle having a bottom cover part as defined above.

In a still further aspect the invention resides in a wind turbine having a nacelle in which are disposed operative components including a gearbox and generator, wherein a nacelle cover is provided having a bottom cover part which is formed with a number of shallow receptacle regions including regions which underlie respectively the gearbox and generator, and wherein flow channels are provided between the receptacle regions so that liquid can flow between them.

BRIEF DESCRIPTION OF THE DRAWINGS

The invention will now be further described by way of example only and with reference to the accompanying figures in which.

DETAILED DESCRIPTION

FIG. 1 illustrates a modern utility scale wind turbine 10 comprising a tower 11 and a wind turbine nacelle 12 positioned on top of the tower 11. The wind turbine rotor 13, comprising three wind turbine blades 14, is supported by the nacelle 12 through a main low speed shaft (not shown) which extends out of the front of the nacelle 12. The tower 11 is supported on and secured to the wind turbine foundation 15. The main rotor shaft extends into or is connected to a speed increasing gearbox, the output of which is provided to a generator for converting the rotation of the rotor 13 into electrical current. The wind turbine typically includes other operative components, such as other items of power handling equipment, converters, transformers and the like.

Various of these operative components may contain liquid for cooling and/or lubricating purposes. For example, gearboxes typically contain lubricating oils which are contained in or circulated in the gearbox casing and supplied to various points in the gearbox, bearings etc. The generator is provided with circulated cooling liquid, usually water. A hydraulic circuit may be provided for operation of rotor pitch adjustment, with hydraulic accumulators arranged within the nacelle. The power handling equipment typically includes a transformer, and these require a means of cooling, which may with certain designs include circulated cooling liquid such as cooling oil. Although major leakage of liquid from such components is unlikely, failure of a sub-component such as a seal can occasionally give rise to liquid leakage. Such might arise during transport to the installation site (the nacelle typically being transported in an assembled condition) or during operation or service of the wind turbine. Leaked liquid can potentially damage other turbine components and create a hazard for personnel and for the environment. Furthermore, such leaked liquid may be time consuming and expensive to clean up. Accordingly, there is need for a structure which can contain liquid leaked or spilled within the turbine nacelle. As discussed further below, such is achieved through adaptations to the nacelle bottom cover.

Figure 2:
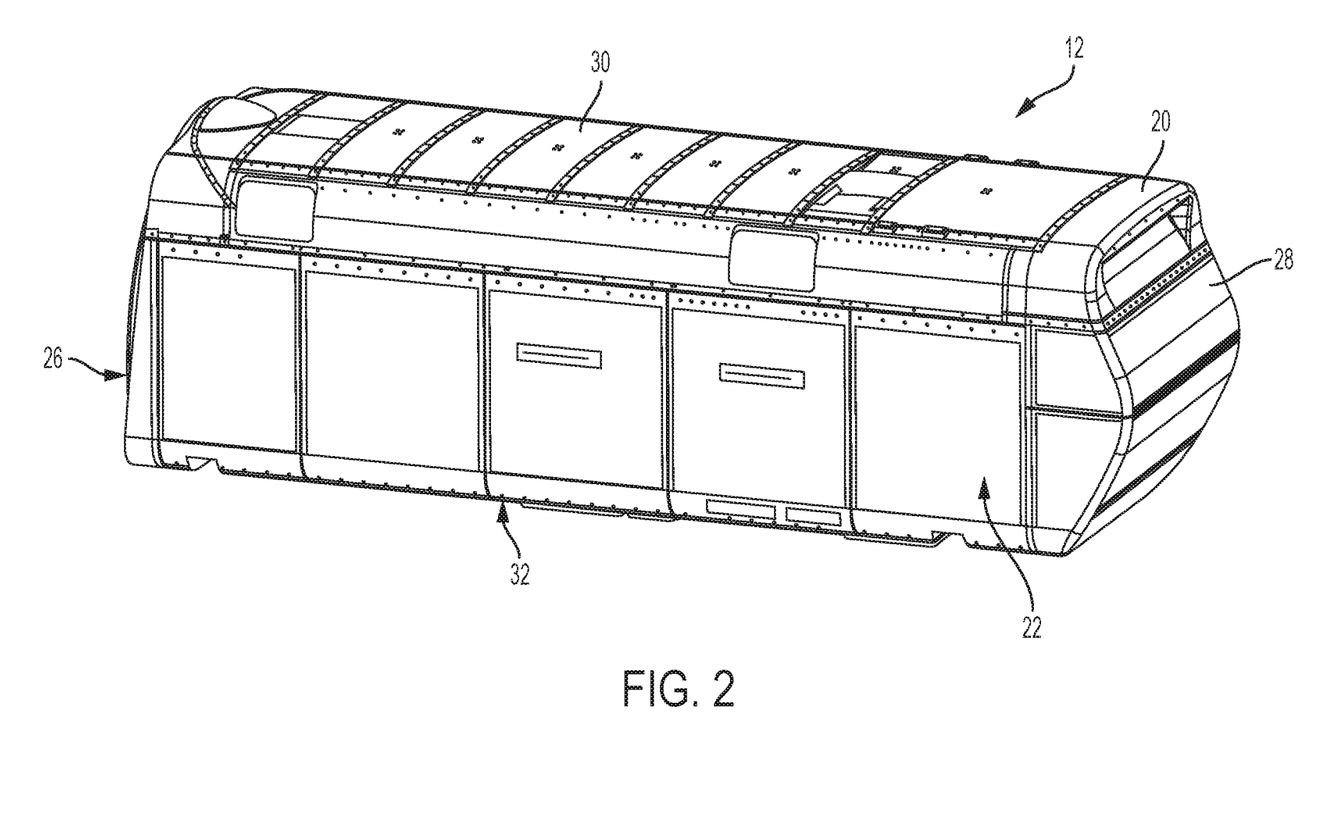
FIG. 2 is a perspective view of the exterior of a wind turbine nacelle.

FIG. 2 illustrates the exterior of a wind turbine nacelle 12. As noted above the nacelle 12 houses the main operative components of the turbine. The nacelle comprises a main load-bearing frame (not visible) onto which are directly or indirectly mounted the main operative components. The nacelle 12 is provided with an external nacelle cover 20 which encloses the operative components and provides protection from the environment, rain, wind, moisture, salt, dust etc. The nacelle cover comprises a number of cover parts which are mounted on an internal frame which is itself connected indirectly or directly to the internal main frame. In the structure as illustrated the cover parts are arranged to provide a generally box-like arrangement, including side covers 22 ends 26, 28, roof cover 30 and bottom cover 32. Each of these parts is constructed from a number of individual panels. Sealing gasket structures are provided between abutting or overlapping panel edges, as well as between complete panel sections to ensure that the nacelle provides a substantially weatherproof environment. The panels are preferably formed of a light relatively rigid structure such as glassfibre reinforced plastics, formed into the desired configuration by moulding.

Figure 3:
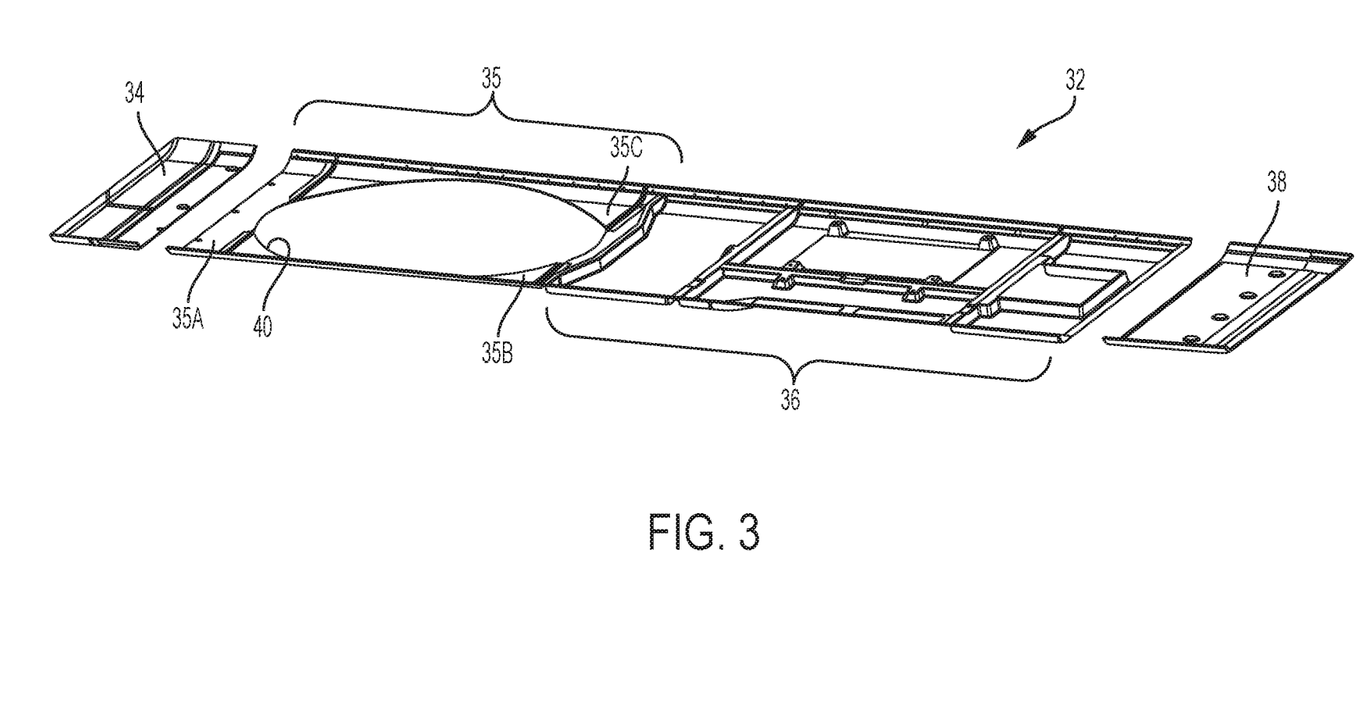
FIG. 3 shows a bottom cover of the nacelle, with end part separated.
Figure 4:
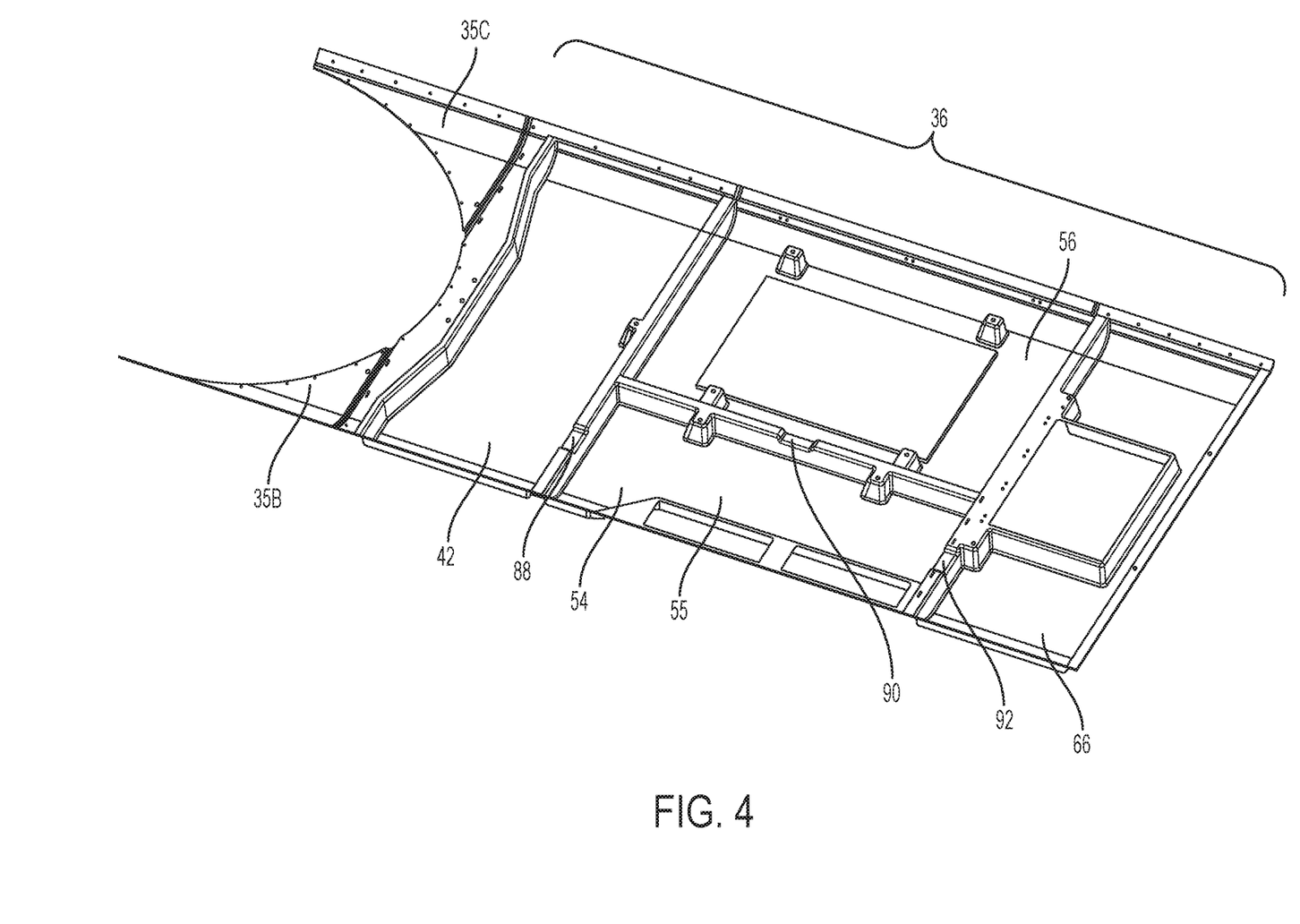
FIG. 4 shows a main part of the bottom nacelle cover.
Figure 5:
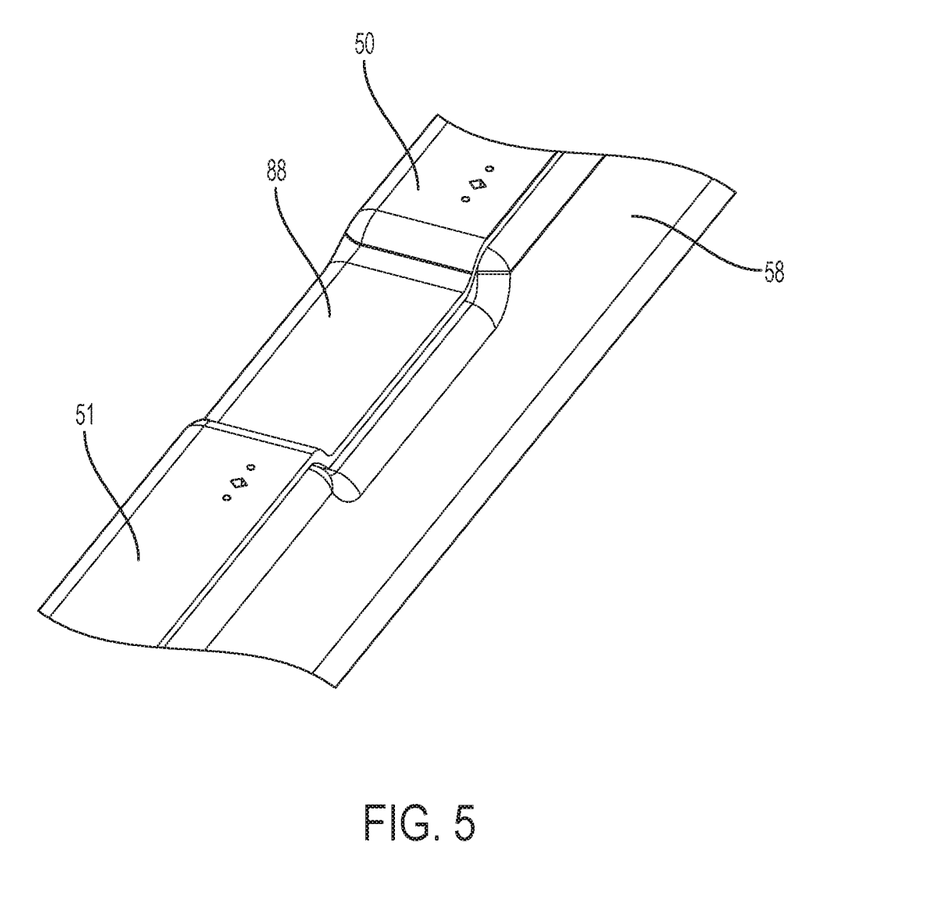
FIG. 5 is an enlarged detail of a rim of a first receptacle region showing a flow channel lip between first and second receptacle regions.

As can be seen in FIG. 3 the bottom cover 32 comprises a number of sections where each section itself is formed of one or more individual panels, more particularly a front section 34, tower section 35, main section 36 and rear section 38 (where "front" refers to the end of the nacelle at which the rotor is mounted and which in operation faces into the wind and "rear" to the opposite end). Front 34 and rear sections 38 are both preferably single panels which are unitary structures. The tower section 35 comprises a number of individual panels including a front tower panel section 35A and two rear tower panel sections 35B and 35C, which together define a circular opening 40 through which in use the yaw components situated between tower top and nacelle extends.

Figure 6:
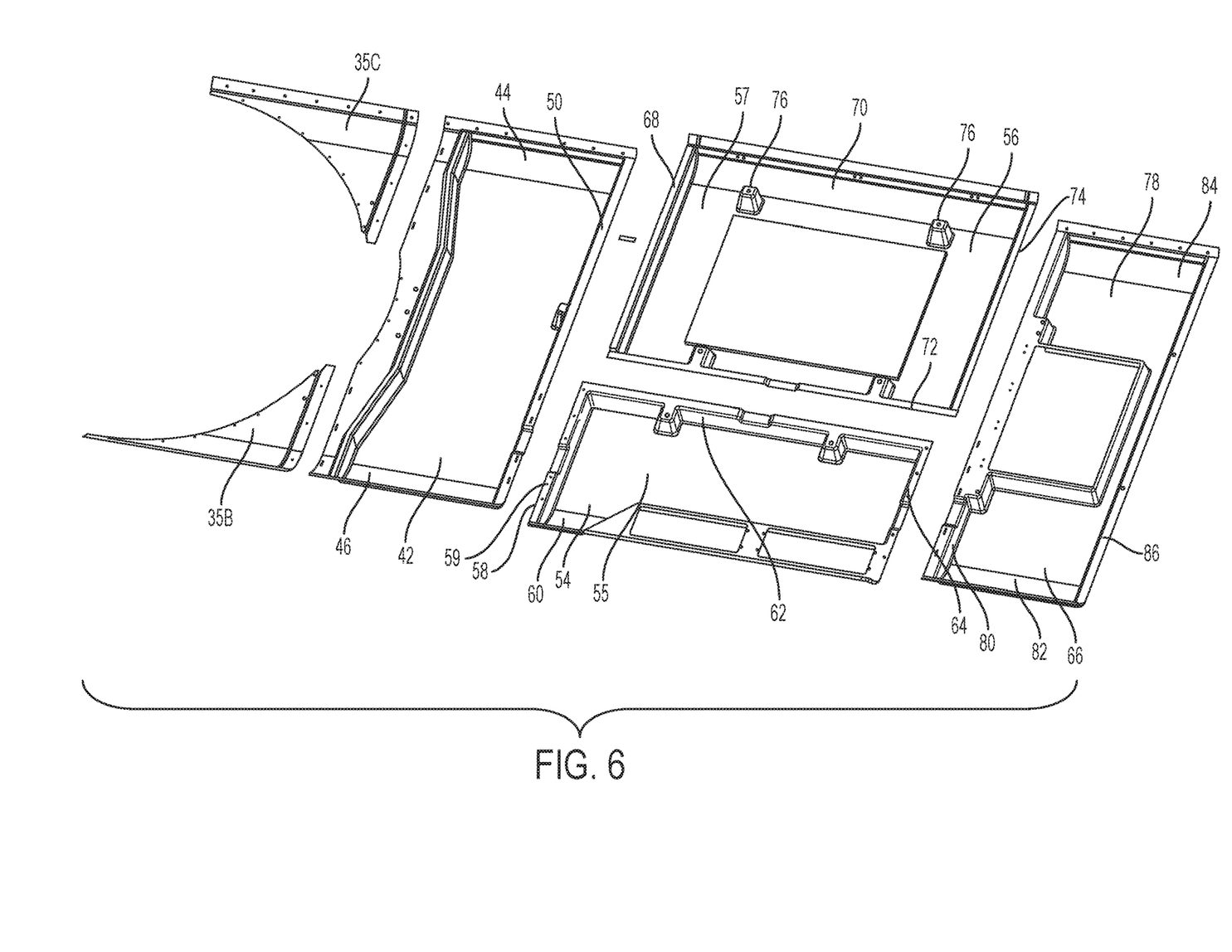
FIG. 6 is a view of a the main part of the bottom cover with the individual cover part sections separated.
Figure 7:
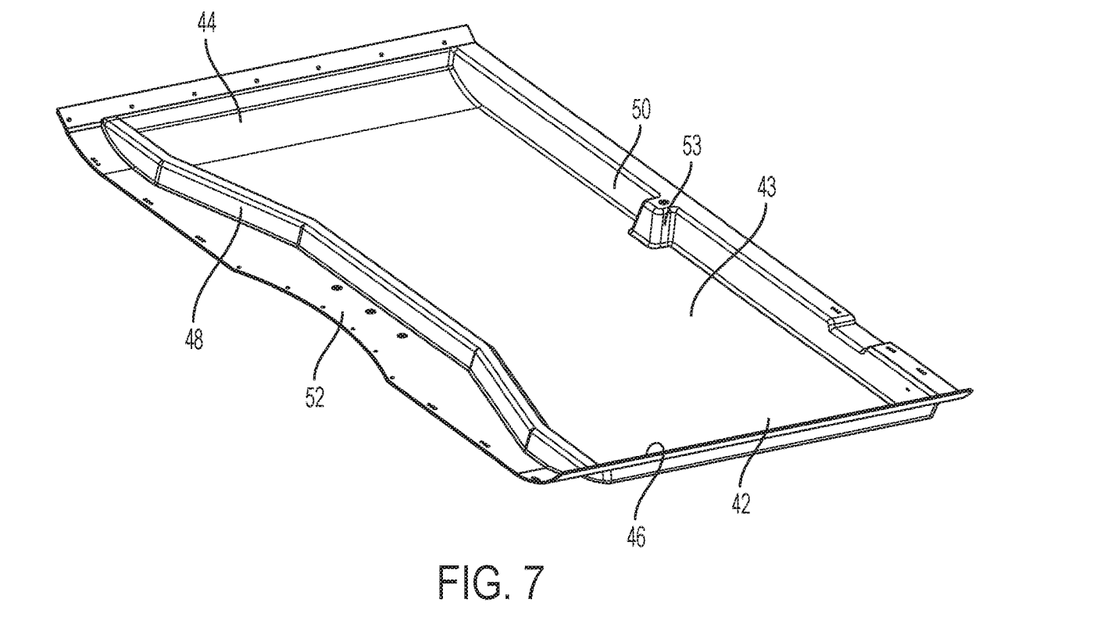
FIG. 7 shows a first cover section of the bottom cover.

The main bottom cover section 36 is formed of a number of interconnected individual panels, including first, second, third and fourth panels 42, 54, 56 and 66 respectively. These constitute liquid-receiving receptacles as is now discussed in more detail. More particularly, first panel 42 defines a first receptacle. As best seen in FIGS. 6 and 7 this is formed to have a concave shallow tray-like form with floor 43 and shallow inclined opposite edges regions 44, 46 on opposite lateral sides, a front upstanding rim 48, and a rear upstanding rim 50. A forward edge region 52 is formed with holes to receive fixings, bolts or the like, for securing to rear edges of the rear tower panel sections 35B and 35C, whereby connection can be made thereto in overlapping manner. A fixing boss 53 is formed in the rim 50, by which attachment can be made to a cover support frame (not shown) which is itself connected to the nacelle main frame. An internal bushing is provided on the underside of the fixing boss 53 into which a fixing bolt is screwed.

The entire panel 42 is preferably a thin-walled unitary moulded structure for ease of manufacture and assembly, including the upstanding rims and other described structures, bosses etc. Alternatively however the rims might be separate upstanding wall structures secured to the panels by adhesive or fixings.

To the rear of first panel 42 are connected the second and third panels 54 and 56 arranged side by side, constituting second and third receptacles respectively. Second panel 54 is likewise formed to have a concave shallow tray-like form with floor 55, an upstanding front rim 58 at which it is connected to the first panel 42, a shallow inclined edge region 60 at a lateral side, a side upstanding rim 62 at which it is connected to third panel 56 and a rear upstanding rim 64 at which it is connected to the fourth panel 66. A pair of fixing bosses 65 are provided at rim 62 by which attachment can be made to the cover support frame (not shown) which is itself connected to the nacelle main frame. Internal bushings are provided on the underside of the fixing bosses 65 into which fixing bolts are screwed.

Figure 8:
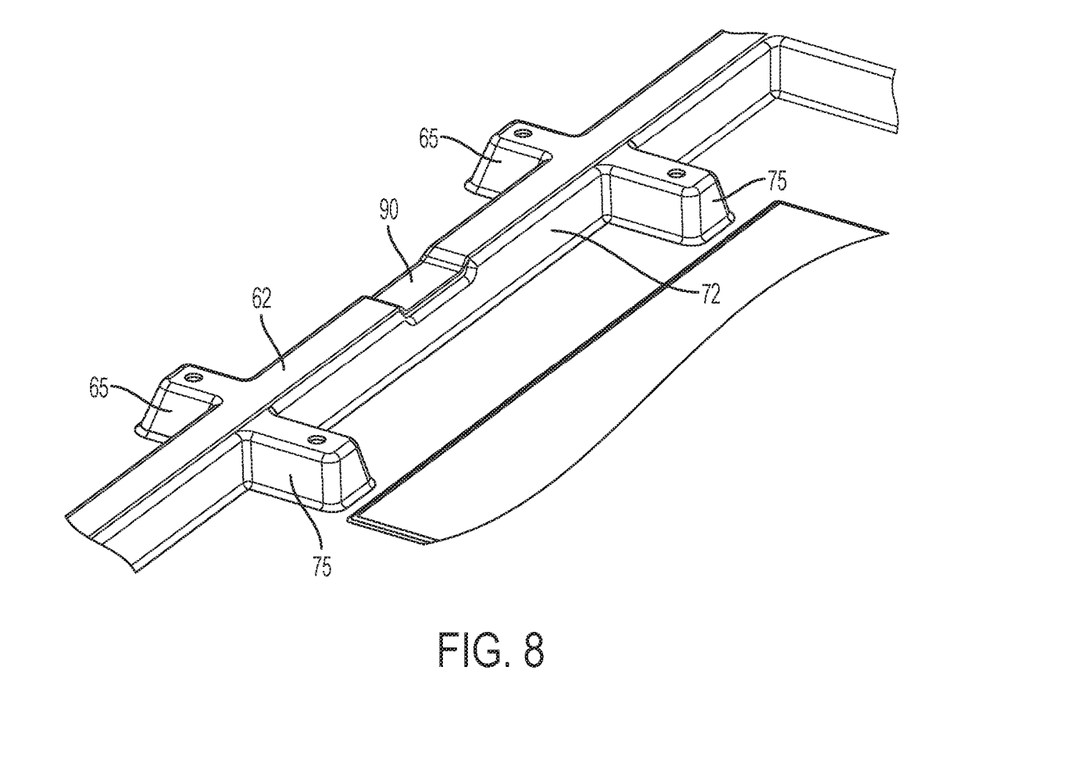
FIG. 8 is an enlarged detail of a rim of the second and third first receptacle regions showing a flow channel lip therebetween.

Third panel 56 is likewise formed to have a concave tray-like form with a floor 57, an upstanding front rim 68 at which it is connected to the first panel 42, a shallow inclined edge region 70 at a lateral side, a side upstanding rim 72 at which it is connected to the second panel 54 and a rear upstanding rim 74 at which it is connected to the fourth panel 66. A pair of fixing bosses 75 (see FIG. 8) are provided at rim 72, by which attachment can be made to the cover support frame (not shown) which is itself connected to the nacelle main frame. A further pair of fixing bosses 76 are provided at the opposite side of the panel 56 adjacent the inclined edge 70. Internal bushings are provided on these fixing bosses into which fixing bolts are screwed.

Fourth panel 66 is likewise formed to have a concave tray-like form with a floor 78, front rim 80 at which it is connected to the second and third panels, shallow inclined edge regions 82, 84 at opposite lateral sides, and a rear upstanding rim 86 at which it is connected to the rear panel 38.

As can be seen in FIGS. 4 to 8 the adjacent rims of the panels at which the panels abut each other are formed with overlapping structures at which they are connected, by suitable fixings, bolts or the like. For example, rear rim 50 of the first panel 42 has an upstanding portion and a horizontally rearwardly-extending flange 51. Front rim 58 of the second panel has an upstanding portion and a forward extending flange portion 59. As can best be seen in FIG. 5, when interconnected the flange portion 50 overlies the flange portion 59. Fixing holes are provided in the overlapping flange portions into which are provided fixing bolts or screws or other fasteners. Sealing gaskets, such as deformable foam gaskets are provided between the overlapping structures to ensure a liquid tight connection therebetween. Similar arrangements are provided for effecting the connections between the first, second, third and fourth panels 42, 54, 56 and 66 respectively.

As can be seen in FIGS. 4 to 6 and 8 the upstanding rims between first, second and third receptacles are formed with regions of reduced height which constitute flow channels or overflow channels. A first overflow channel 88 is provided in overlapping rear and front rims 50, 59 respectively of first and second panels, allowing flow between first and second receptacles. A second overflow channel 90 is formed in rims 62 and 72 allowing flow between second and third receptacles. A third flow channel 92 is provided in overlapping rims 64 and 80 allowing flow between third and fourth receptacles. The height of these reduced height regions is such that any small amount leakage or spillage is contained in the one receptacle which underlies the leaking component thereby preventing its escape to elsewhere in the turbine where it might damage other components or equipment or present a hazard to personnel or environment. From there the liquid can be safely removed and disposed of by service personnel. In the event of a significant leakage which fills a particular receptacle, liquid can then flow via the defined overflow channels between receptacles, such that an adjacent receptacle, and eventually all the receptacles become available to contain leaked liquid. By ensuring that the total combined volume of receptacles is greater than the volume of liquid in any particular operative component (gearbox, generator etc.) it is then ensured that leaked or spilled liquid can be fully contained.

Figure 11:
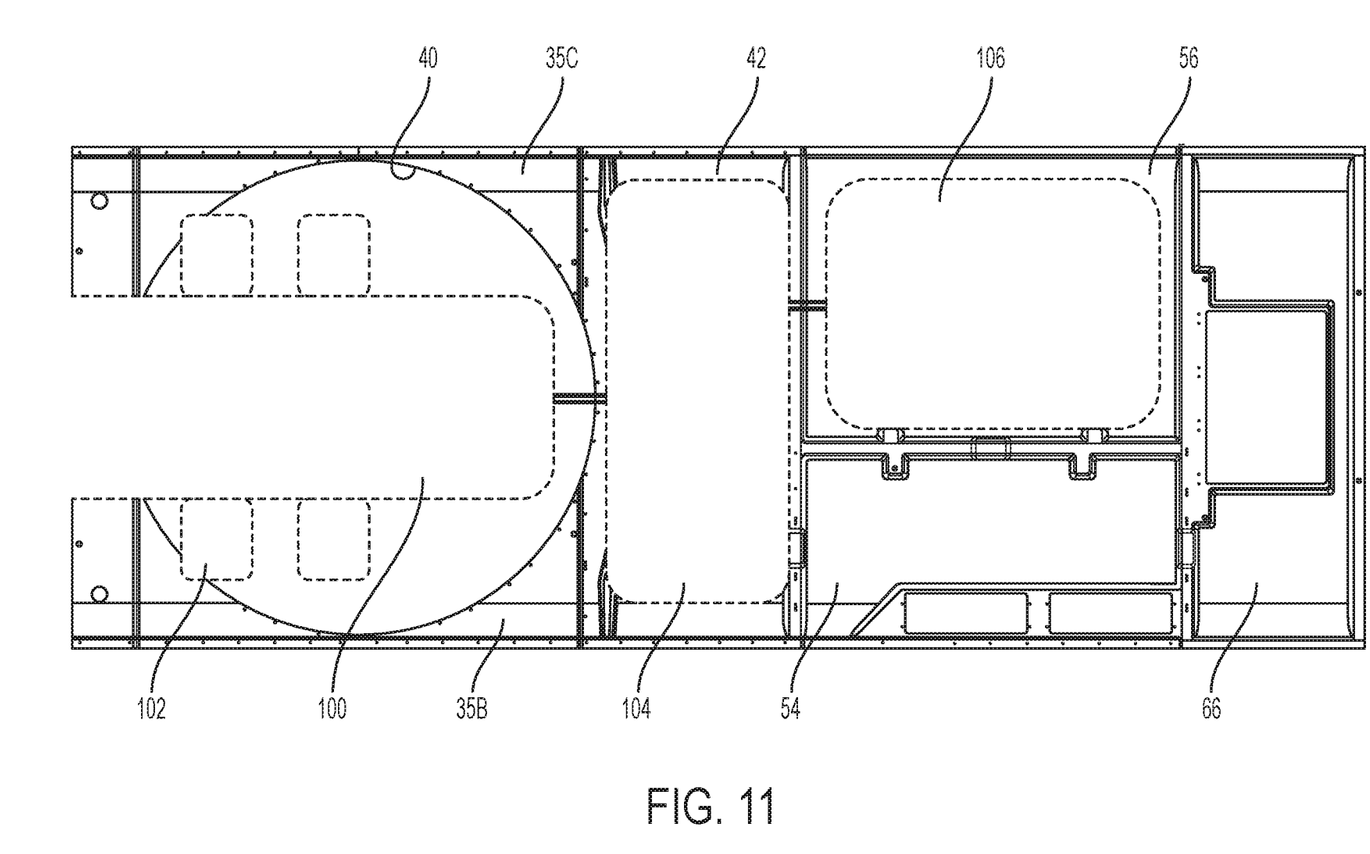
FIG. 11 shows the bottom cover part and location of main turbine components relative to receptacles.

The four receptacle regions defined in first to fourth panels 42, 52, 54 and 66 are associated with different operative components which overlie respective receptacles. FIG. 11 shows schematically the location of certain main components. The main shaft 100 and bearings 102 overlie opening 40. The first receptacle defined in panel 42 underlies the gearbox indicated 104. This receptacle is formed to contain about 330 litres. Third receptacle defined in third panel 56 underlies the generator and is formed to be able to contain about 360 litres. Second receptacle defined in second panel 54 underlies hydraulic accumulators (not illustrated) and is formed to be able to contain about 210 litres. Fourth receptacle defined in fourth panel 66 has no particular component associated therewith, and constitutes a buffer region to receive liquid overflow from other receptacle regions. The combined total volume is in the region of about 1100 litres, which is selected to be able to accommodate the entire liquid volume from the component which has the highest liquid volume, which is typically the gearbox.

Figure 9:
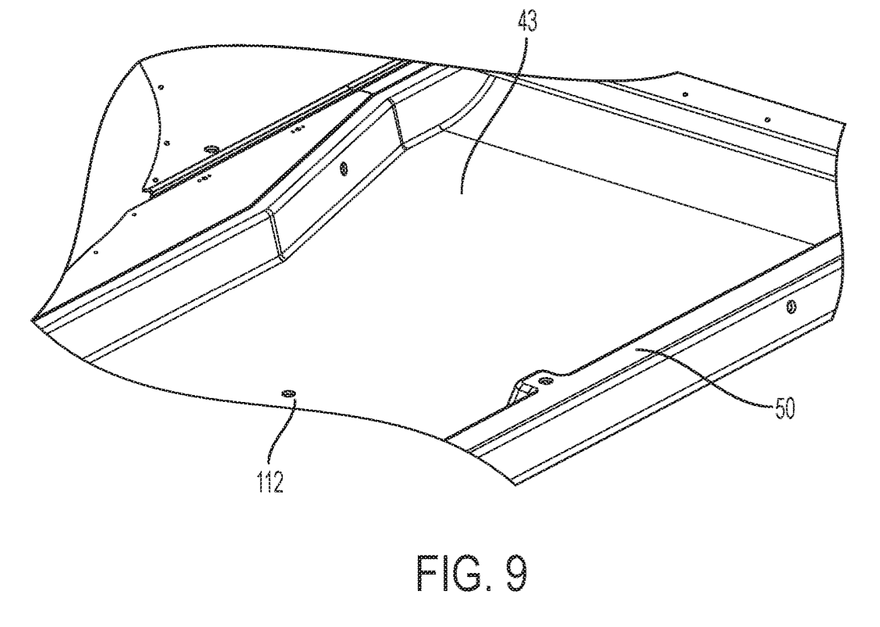
FIG. 9 shows an alternative embodiment with flow openings in the rims between receptacle regions.
Figure 10:
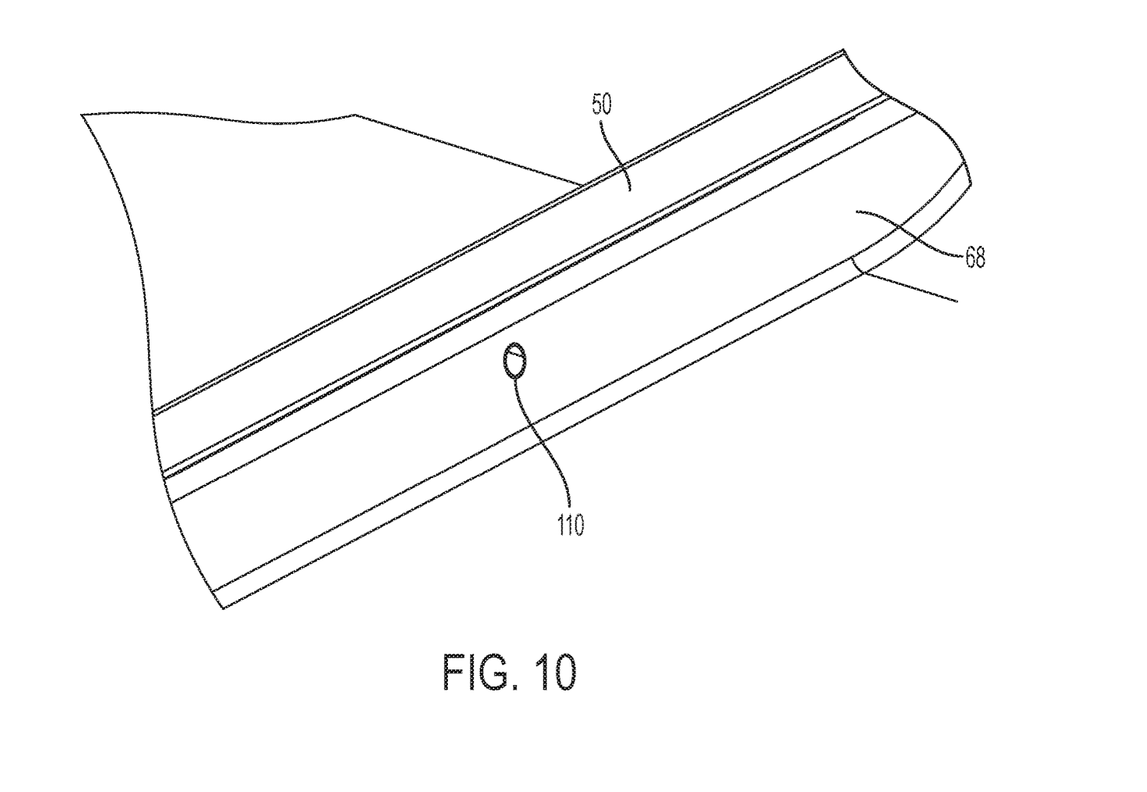
FIG. 10 shows a detail of a flow opening of FIG. 9.

In an alternative form as illustrated in FIGS. 9 and 10 the flow channels are formed by means of openings 110 in the upstanding portions of the rims. Depending on the precise construction, the upstanding portions of the overlapping rims may be spaced apart when the flanges abut in which case flow tubes are arranged between the openings. In a further alternative, the openings may be provided towards the base of the upstanding rims, in which case the receptacles effectively fill as one.

In the event of leakage or spillage service personnel will need to enter the wind turbine nacelle and pump out the liquid from the receptacle(s) into containers for safe disposal. The receptacles may also be provided with drain openings at low points therein, closed by plugs or valves to facilitate the draining of leaked liquid from the receptacle regions. FIG. 9 shows a drain opening 112 in the floor 43 of the first receptacle Although a particular construction of bottom cover is illustrated in which liquid capturing receptacles are formed in separate panels, one panel forming one receptacle, the invention is not so limited, and it will appreciated that other constructions are possible. For example, the entire bottom cover may be formed as a unitary structure. Alternatively, panels may be combined so that fewer individual panels are used. Individual panels may be further subdivided into additional receptacles by the provision of additional walls or rims. Thus, the number of panels and receptacles may be varied. Instead of interconnecting panels at the upstanding rims which define the receptacles, connection may be made at abutting horizontal edges in the floor of a receptacle and the upstanding rims which define the receptacles formed at positions away from the panel edges.

It will be appreciated that various modifications to the embodiments described above are possible and will occur to those skilled in the art without departing from the scope of the invention which is defined by the following claims.

The invention claimed is:

1. A cover part for the underside of a wind turbine nacelle, comprising:
   a number of individual interconnected panels, each panel formed with a number of receptacle regions, wherein the number of receptacle regions is configured to be associated with respective operative components in the wind turbine nacelle for containing liquid leaked or spilled from the operative components,
   wherein adjacent interconnected panels are connected at overlapping edge regions; and
   wherein flow channels are provided between the receptacle regions so that liquid can flow between them.

2. The cover part according to claim 1 wherein each of the panels is defined at least in part by upstanding rims.

3. The cover part according to claim 2 wherein the flow channels are constituted by regions of reduced height provided in the upstanding rims.

4. The cover part according to claim 2 wherein the flow channels are provided by openings in the upstanding rims.

5. The cover part according to claim 2 wherein the upstanding rims include an upstanding portion and a flange portion extending from the upstanding portion, wherein the overlapping edge regions include overlapping flange portions, and wherein the flow channels are formed in the overlapping flange portions.

6. The cover part according to claim 1 comprising a first receptacle region configured to lie beneath a gearbox in the wind turbine nacelle.

7. The cover part according to claim 1 comprising a second receptacle region configured to lie beneath a generator in the wind turbine nacelle.

8. The cover part according to claim 1 comprising a third receptacle region configured to lie beneath one more hydraulic accumulators in the wind turbine nacelle.

9. The cover part according to claim 1, wherein each receptacle region is dimensioned to receive between 100 and 400 litres of liquid.

10. The cover part according to claim 1, wherein the receptacle regions are dimensioned to receive in combined total at least 1000 litres of liquid.

11. The cover part according to claim 1 wherein the receptacle regions are provided with drain holes fitted with plugs or valves to allow liquid to be drained therefrom.

12. A wind turbine nacelle having a cover part according to claim 1.

13. A wind turbine having a nacelle fitted with a cover part according to claim 1.

14. A wind turbine comprising:
a nacelle;
operative components including a gearbox and generator disposed within the nacelle; and
a nacelle cover coupled to the nacelle and having a bottom cover part formed with a number of receptacle regions which underlie and are associated with respectively the gearbox and generator, and wherein flow channels are provided between the receptacle regions so that liquid can flow between them.

15. The wind turbine according to claim 14 wherein the number of receptacle regions includes a first receptacle region having a first upstanding rim which circumscribes the gearbox and a second receptacle region having a second upstanding rim which circumscribes the generator.

16. The wind turbine according to claim 15 wherein the number of receptacle regions includes a third receptacle region having a third upstanding rim which circumscribes one more hydraulic accumulators.

17. The wind turbine according to claim 14 wherein the cover part is formed by a number of individual interconnected panels where the receptacle regions are defined in some or all of the panels.

18. The wind turbine according to claim 17 wherein the panels are connected at overlapping edge regions.

19. The wind turbine according to claim 14 wherein the receptacles are defined at least in part by upstanding rims.

20. The wind turbine according to claim 19 wherein the flow channels are constituted by regions of reduced height provided in the upstanding rims.

21. The wind turbine according to claim 19 wherein the flow channels are provided by openings in the upstanding rims.

22. The wind turbine according to claim 14 wherein the receptacle regions are provided with drain holes fitted with plugs or valves to allow liquid to be drained therefrom.

* * * * *